(12) United States Patent
Schmidl et al.

(10) Patent No.: US 6,829,290 B1
(45) Date of Patent: Dec. 7, 2004

(54) WIRELESS COMMUNICATIONS SYSTEM WITH COMBINING OF MULTIPLE PATHS SELECTED FROM CORRELATION TO THE PRIMARY SYNCHRONIZATION CHANNEL

(75) Inventors: Timothy M. Schmidl, Dallas, TX (US); Alan Gatherer, Richardson, TX (US); Srinath Hosur, Plano, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 587 days.

(21) Appl. No.: 09/669,394

(22) Filed: Sep. 26, 2000

Related U.S. Application Data (60) Provisional application No. 60/156,566, filed on Sep. 28, 1999.

(51) Int. Cl.[7] .............................................. H04B 1/69
(52) U.S. Cl. ...................... 375/147; 375/142; 375/150; 375/137
(58) Field of Search ................................. 375/147, 150, 375/137, 142

(56) References Cited

U.S. PATENT DOCUMENTS

| | | | | |
|---|---|---|---|---|
| 5,101,501 A | * | 3/1992 | Gilhousen et al. | 455/442 |
| 5,109,390 A | * | 4/1992 | Gilhousen et al. | 370/335 |
| 5,235,615 A | * | 8/1993 | Omura | 370/342 |
| 5,289,499 A | * | 2/1994 | Weerackody | 375/141 |
| 5,644,591 A | * | 7/1997 | Sutton | 375/142 |
| 5,835,590 A | * | 11/1998 | Miller | 380/266 |
| 5,953,364 A | * | 9/1999 | Yamamoto | 375/147 |
| 5,995,539 A | * | 11/1999 | Miller | 375/222 |
| 6,345,069 B1 | * | 2/2002 | Dabak et al. | 375/152 |
| 6,363,060 B1 | | 3/2002 | Sarkar | |
| 6,370,397 B1 | | 4/2002 | Popovic et al. | |
| 6,389,058 B1 | * | 5/2002 | Lee et al. | 375/141 |
| 6,414,988 B1 | * | 7/2002 | Ling | 375/150 |
| 6,504,830 B1 | | 1/2003 | Ostberg et al. | |
| 6,574,205 B1 | * | 6/2003 | Sato | 370/335 |
| 6,625,197 B1 | * | 9/2003 | Lundby et al. | 375/130 |

* cited by examiner

*Primary Examiner*—Stephen Chin
*Assistant Examiner*—Sudhanshu C. Pathak
(74) *Attorney, Agent, or Firm*—Ronald O. Neerings; Wade James Brady, III; Frederick J. Telecky, Jr.

(57) ABSTRACT

A wireless receiver (UST). The receiver comprises at least one antenna (ATU) for receiving a plurality of frames (FR) in a form of a plurality of paths. Each of the plurality of frames comprises a plurality of time slots ($SL_N$), and each of the plurality of time slots comprises a plurality of symbols. Further, each of the plurality of paths has a corresponding sample position, wherein the plurality of symbols comprise a primary synchronization code symbol (PSC). The receiver further comprises circuitry (52) for correlating a primary synchronization code across a group of the plurality of symbols, and circuitry for identifying a plurality of path positions within the group. Each of the plurality of path positions corresponds to a respective one of a plurality of largest-amplitude paths represented within the group as detected in response to the circuitry for correlating. Finally, the receiver comprises circuitry for combining (54, 58) the plurality of largest-amplitude paths in response to identification of those paths by the circuitry for identifying.

22 Claims, 5 Drawing Sheets

WIRELESS COMMUNICATIONS SYSTEM WITH COMBINING OF MULTIPLE PATHS SELECTED FROM CORRELATION TO THE PRIMARY SYNCHRONIZATION CHANNEL

CROSS-REFERENCES TO RELATED APPLICATIONS

This application claims the benefit, under 35 U.S.C. §119(e)(1), of U.S. Provisional Application No. 60/156,566 (TI-29351PS), filed Sep. 28, 1999.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to selecting paths for further processing in such systems.

Wireless communications have become very prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." More particularly, CDMA systems are characterized by simultaneous transmission of different data signals over a common channel by assigning each signal a unique code. This unique code is matched with a code of a selected user station within the cell to determine the proper recipient of a data signal.

CDMA continues to advance along with corresponding standards that have brought forth a next generation wideband CDMA ("WCDMA"). WCDMA includes alternative methods of data transfer, one being time division duplex ("TDD") and another being frequency division duplex ("FDD"). The present embodiments may be incorporated in either TDD or FDD and, thus, both are further introduced here. TDD data are transmitted in one of various different forms, such as quadrature phase shift keyed ("QPSK") symbols or other higher-ordered modulation schemes such as quadrature amplitude modulation ("QAM") or 8 phase shift keying ("PSK"). In any event, the symbols are transmitted in data packets of a predetermined duration or time slot. Within a data frame having 15 of these slots, bi-directional communications are permitted, that is, one or more of the slots may correspond to communications from a base station to a user station while other slots in the same frame may correspond to communications from a user station to a base station. Further, the spreading factor used for TDD is relatively small, whereas FDD may use either a large or small spreading factor. FDD data are comparable in many respects to TDD including the use of 15-slot frames, although FDD permits a different frequency band for uplink communications (i.e., user to base station) versus downlink communications (i.e., base to user station), whereas TDD uses a single frequency in both directions.

Due to various factors including the fact that CDMA communications are along a wireless medium, an originally transmitted communication from a base station to a user station may arrive at the user station at multiple and different times. Each different arriving signal that is based on the same original communication is said to have a diversity with respect to other arriving signals originating from the same transmitted communication. Further, various diversity types may occur in CDMA communications, and the CDMA art strives to ultimately receive and identify the originally transmitted data by exploiting the effects on each signal that are caused by the one or more diversities affecting the signal.

One type of CDMA diversity occurs because a transmitted signal from a base station is reflected by objects such as the ground, mountains, buildings, and other things that it contacts. As a result, a same single transmitted communication may arrive at a receiving user station at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the user station and the channel traveled by each may cause each path to have a different phase, amplitude, and signal-to-noise ratio ("SNR"). Accordingly, for one communication from one base station to one user station, each multipath is originally a replica of the same originally transmitted data, and each path is said to have time diversity relative to other multipath(s) due to the difference in arrival time which causes different (uncorrelated) fading/noise characteristics for each multipath. Although multipaths carry the same user data to the receiver, they may be separately recognized by the receiver based on the timing of arrival of each multipath. More particularly, CDMA communications are modulated using a spreading code which consists of a series of binary pulses, and this code runs at a higher rate than the symbol data rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. Given the transmission of the CDMA signal using chips, then multipaths separated in time are distinguishable at the receiver because of the low auto-correlations of CDMA codes. Also, given that numerous multipaths may arrive at a receiving user station, the prior art endeavors to select certain of these multipaths and then to perform various processing on those paths in an effort to combine the signals to remove the effects of the diversity and to better recover the originally-transmitted data represented by those signals. However, before this selection process occurs, various acquisition steps are performed by the receiving user station and which are discussed below by way of further introduction.

According to the prior art a receiving user station first processes incoming signals, often using what is referred to as a searcher and in a first acquisition stage. Specifically, each incoming frame includes a so-called synchronization channel against which correlations may be made by the receiving user station for purposes of acquisition, where the synchronization channel includes two codes, namely, a primary synchronization code ("PSC") and a secondary synchronization code ("SSC"). The PSC is presently a 256 chip Golay code and the same PSC code is transmitted from numerous base stations. Each base station group transmits a unique set of SSC code words. In any event, during the first acquisition stage, the user station continuously samples information in at least one slot and performs a PSC correlation on those samples. For example, this technique may be implemented by applying the received information to a matched filter having the 256 chip Golay code of the PSC as coefficients to the filter, and the results of the correlations may be processed further such as through the use of averaging. Moreover, the number of measured correlations typically depends on the data rate and sample rate. For example, presently a single slot in a frame has a 667 μsec duration corresponding to a chip rate of 3.84 Mcps (although in the past the chip rate was 4.096 Mcps and provided a 625 μsec slot duration). Further, such a slot typically includes 2560 chips, and the PSC correlation measurement or sampling is typically twice per chip, thereby giving rise to a total of 5120 sample positions evaluated per slot. In any event, as a result of these measurements, one or more paths within the evaluated time period are found to have relatively Garge PSC correlations, and the position(s) of these path(s) are generally used to identify the timing of incoming frames. Lastly, since the PSC is the same for various base stations, then note that the identified one or more paths may correspond to one or more base stations.

Also according to the prior art, a receiving user station next processes incoming signals to perform a second acquisition stage with respect to the SSCs in the incoming signals. Recalling that the SSC is base-station specific, note that the second acquisition stage is therefore directed to a particular base station. Further, note that the accumulation of several SSCs across a frame or frames are sometimes referred to in the art as comma free codes. Thus, correlations of the comma free codes are measured during the second acquisition stage. Once the SSCs are detected in the incoming signal, the user station is thereby informed of the data (i.e., frame) location within the base station communications. Further, once the user station has detected a unique base station SSC, the user station also may identify a so-called group of long codes that is also unique to, and transmitted by, the base station, where that long code is then usable by the user station to demodulate data received from the base station.

Figure 1:
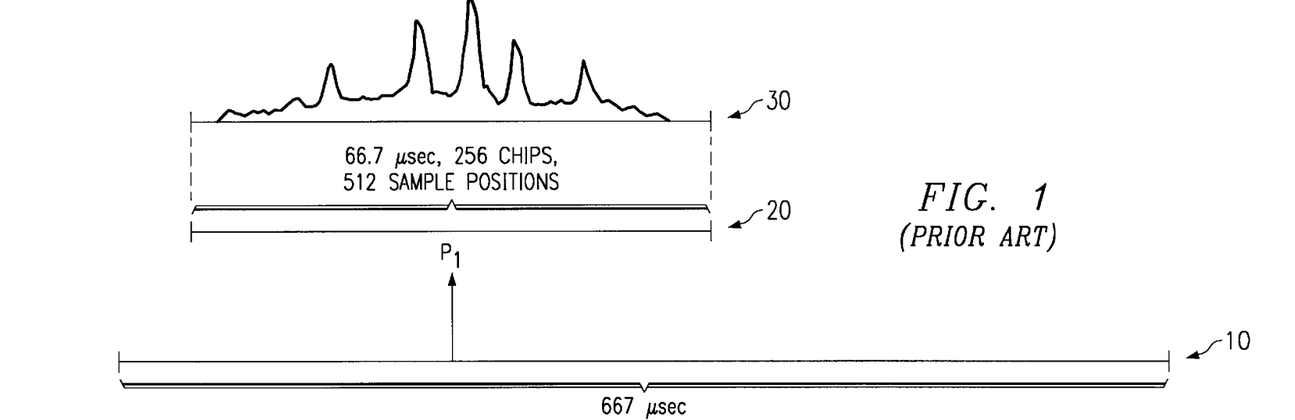
FIG. 1 illustrates a conceptual diagram demonstrating a prior art technique for identifying multipaths at a receiver by performing a second acquisition stage across a search window centered about a path in a time slot window.

Continuing with the prior art and as now illustrated with reference to FIG. 1, once the long code is determined by the user station, then the user station defines, relative to a time slot window 10, a search window 20, where typically search window 20 is a time period centered about a path $P_1$. Typically, search window 20 is on the order of one-tenth the duration of time slot window 10. Thus, in the illustrated example wherein time slot window 10 is 667 μsec, then search window 20 is 66.7 μsec. Given the chip rates mentioned above, therefore, search window 20 includes 256 chips. Further, search window 20 is examined at a rate of two samples per chip, thereby giving rise to a total of 512 sample positions within search window 20 and spaced apart from one another in one-half chip increments. Having established search window 20, next the receiver performs a so-called delay profile estimation ("DPE"), where this DPE is across every sample position in search window 20 (i.e., 512 positions). The result of this DPE is shown in FIG. 1 as a spectrum 30. Next, the receiver identifies a number of paths corresponding to the respective peak locations of spectrum 30, and those paths are then further processed so that the diversity may be exploited toward recovering the actual symbols from the various paths such as by combining those paths. Such an operation for large spreading factor FDD communications is often performed by assigning each identified path to a corresponding finger of a rake receiver, where the rake receiver performs what is referred to as a maximal ratio combining ("MRC") operation which combines the various paths taking into account the respective delays of those paths. Similarly, for a small spreading factor FDD communication, or for a TDD communication, a comparable operation is performed by what may be referred to as a joint detector which includes both a rake receiver and an equalizer function to combine the various identified paths.

While the preceding prior art operations have proven useful in identifying multipaths for further processing, the present inventors have observed various drawbacks from this approach. Specifically, the DPE across search window 20 requires considerable computational complexity. For example, the DPE with respect to search window 20 is typically performed with respect to the pilot symbols at each sample position, and to perform this operation first the long code is ascertained in the second acquisition stage, and then for the DPE the long code must be stripped from each pilot symbol. As another example, this same operation is performed for every half-hip sample position within search window 20 and, thus, each calculation must be repeated 512 times. Thus, the various above-described details yield a very large number of computations to perform the DPE across search window 20. The large computational demands of the preceding have corresponding drawbacks. For example, such operations consume various resources such as hardware availability and power. These resources may be particularly valuable at the receiver which is often a portable device and, as such, where it is desired to reduce the complexity and power requirements of such a device.

In view of the preceding, there is a need to improve the identification and selection of multipaths for combining those selected signals such as in an MRC process, and this need is addressed by the preferred embodiments as described below.

BRIEF SUMMARY OF THE INVENTION

In the preferred embodiment, there is a wireless receiver. The receiver comprises at least one antenna for receiving a plurality of frames in a form of a plurality of paths. Each of the plurality of frames comprises a plurality of time slots, and each of the plurality of time slots comprises a plurality of symbols. Further, each of the plurality of paths has a corresponding sample position, wherein the plurality of symbols comprise a primary synchronization code symbol. The receiver further comprises circuitry for correlating a primary synchronization code across a group of the plurality of symbols, and circuitry for identifying a plurality of path positions within the group. Each of the identified plurality of path positions corresponds to a respective one of a plurality of largest-amplitude paths represented within the group as detected in response to the circuitry for correlating. Finally, the receiver comprises circuitry for combining the plurality of largest-amplitude paths in response to identification of those paths by the circuitry for identifying. Other circuits, systems, and methods are also disclosed and claimed.

DETAILED DESCRIPTION OF THE INVENTION

FIG. 1 was described earlier in the Background of the Invention section of this document and the reader is assumed to be familiar with the principles described in that section.

Figure 2:
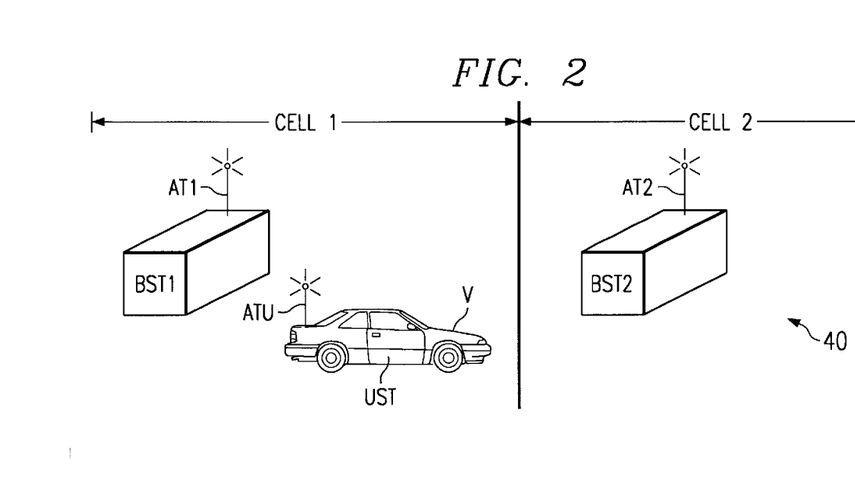
FIG. 2 illustrates a diagram of a cellular communications system by way of a contemporary code division multiple access ("CDMA") example in which the preferred embodiments may be implemented.

FIG. 2 illustrates a diagram of a cellular communications system 40 by way of a contemporary code division multiple access ("CDMA") or wideband CDMA ("WCDMA") example in which the preferred embodiments may be implemented. Within system 40 are shown two base stations BST1 and BST2. Each base station BST1 and BST2 includes a respective antenna AT1 and AT2 from which the station may transmit or receive CDMA signals. The general area of intended reach of each base station defines a corresponding cell; thus, base station BST1 is intended generally to communicate with cellular devices within Cell 1 while base station BST2 is intended generally to communicate with cellular devices within Cell 2. Of course, some overlap between the communication reach of Cells 1 and 2 exists by design to support continuous communications should a communication station move from one cell to the other. Indeed, further in this regard, system 40 also includes a user station UST, which is shown in connection with a vehicle V to demonstrate that user station UST is mobile. Thus, vehicle V and its corresponding user station UST may move freely in and between Cell 1 and Cell 2 (or other cells). In addition, by way of example user station UST includes a single antenna ATU for both transmitting and receiving cellular communications, although user station UST could alternatively include more than one such antenna.

In some respects, system 40 may operate according to known general techniques for various types of cellular or other spread spectrum communications, including CDMA/WCDMA communications. Such general techniques are known in the art and include the commencement of a call from user station UST and the handling of that call by either or both of base stations BST1 and BST2. Other techniques are ascertainable by one skilled in the art.

One aspect of operation of system 40 which is further enhanced according to the preferred embodiments, and which in various respects is also reflected in the prior art, relates to the detection of multipaths and the assignment of selected multipaths to signal combining circuitry (e.g., a rake receiver) for further processing by user station UST. For example with respect to FIG. 2, since user station UST is located within Cell 1, then user station UST receives signals from base station BST1; however, since Cell 2 is nearby, then user station UST also may receive signals from base station BST2. In any event, user station UST in response to these signals attempts to identify the most favorable of those paths that are most likely from base station BST1 because user station UST is in Cell 1, which corresponds to base station BST1, and those signals are further processed as further explored below.

Figure 3:
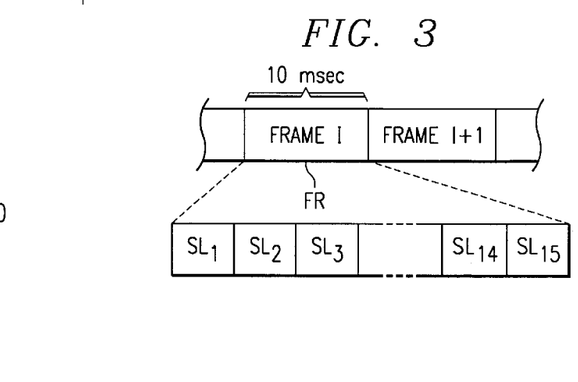
FIG. 3 illustrates a succession of radio frames where each frame FR is divided into equal-duration slots.

FIG. 3 illustrates a succession of radio frames that may be communicated between user station UST and either base station BST1 or base station BST2, and they are illustrated by way of further introduction to the analysis of information within defined time periods as performed by the preferred embodiment. Each frame FR and its division into portions referred to as slots are known in the art. By way of example, a frame FR may be 10 milliseconds long and is divided into equal duration slots (e.g., 16 slots where, therefore, each slot has a duration of 625 $\mu$sec, or more recently 15 slots with each having a duration of 667 $\mu$sec). For the sake of reference, such slots are shown in FIG. 3 as $SL_1$ through $SL_{15}$.

Figure 4:
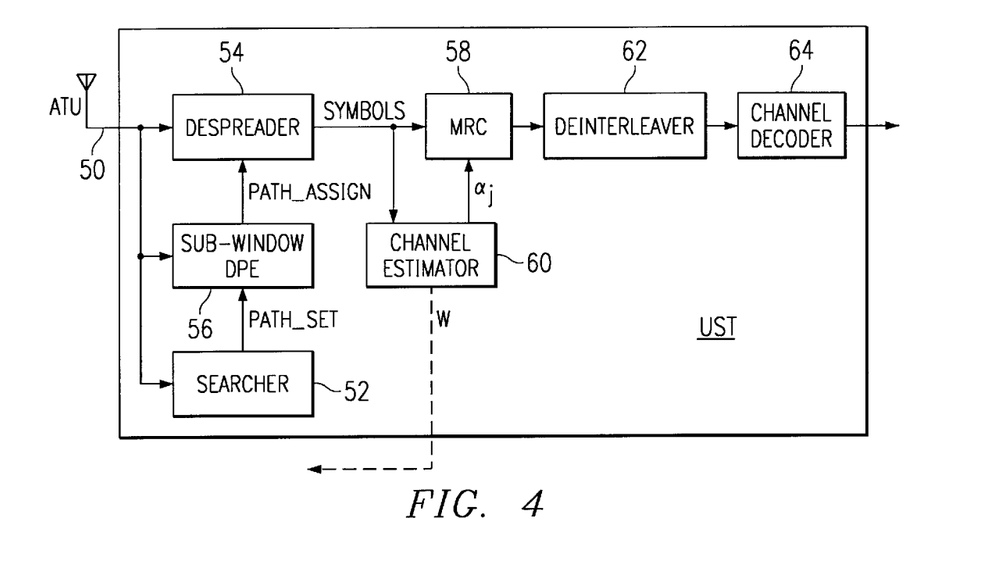
FIG. 4 illustrates a block diagram of the circuitry of a user station according to a first embodiment wherein a number of paths identified by PSC correlations taken across a time slot window are used to create sub-windows across which a DPE is performed to identify sample positions of paths to be combined.

FIG. 4 illustrates a preferred embodiment of user station UST in greater detail, and in which a preferred method for path detection and selection for signal combining is further discussed below. By way of introduction, user station UST is shown in block diagram form where given the following discussion one skilled in the art may ascertain various different circuits and combined software/firmware techniques for implementing the blocks of user station UST. Further, the various blocks shown are separated to facilitate an understanding of the preferred embodiments and not by way of limitation and, thus, one skilled in the art may add other functionality to such blocks or further subdivide or combine the functions detailed below. Also, for the sake of presentation, the following discussion first examines the functionality of each block generally with some of this functionality detailed further later by way of a method $UST_m$ shown as a flow diagram in FIG. 5.

Looking to various connections in FIG. 4, antenna ATU of user station UST is for receiving-communications from one or more base stations (e.g., from transmit antennas AT1 and AT2 of base stations BST1 and BST2). Recall that such communications may pass by various multipaths. Within user station UST, signals received by antenna ATU are connected to an input 50, and input 50 is connected to three different branches within user station UST. Specifically, input 50 is connected to a searcher 52 thereby beginning a first branch, input 50 is connected to a despreader 54 thereby beginning a second branch, and input 50 is connected to a sub-window DPE block 56 in a third branch. Looking to the first branch of connections within FIG. 4 in greater detail, searcher 52 performs an initial acquisition with respect to its input signal and outputs in response a signal PATH_SET which thereby identifies a set of paths (or their sample positions) to sub-window DPE block 56. Sub-window DPE block, as further connected in the third branch, performs a DPE for signals from input 50 as included in a number of sub-windows, where each sub-window includes a path (or its sample position) identified in the PATH_SET signal from searcher 52. In response, sub-window DPE block 56 outputs a PATH_ASSIGN signal to despreader 54, thereby directing the remaining discussion back to the first branch of user station UST.

Continuing with the blocks and connections in the first branch of user station UST, despreader 54 operates in part according to known principles, such as by multiplying the CDMA signal times the combination of the long code and the Walsh code and summing the chips to form symbols and thereby producing a despread symbol stream at its output and at the symbol rate. As detailed below, however, in the preferred embodiment this operation is further enhanced in that despreader 54 only despreads and outputs symbols for the set of paths identified by the PATH_ASSIGN signal from sub-window DPE block 56. The despread signals output by despreader 54 are coupled to an MRC block 58 and also to a channel estimator 60. Channel estimator 60 determines estimated channel impulse responses based on the incoming despread symbols. Channel estimator 60 provides these estimated channel impulse responses, illustrated in FIG. 4 as $\alpha_j$, to MRC block 58. Further, user station UST is shown by way of example as an open loop system; however, the preferred embodiment also could be implemented in an alternative embodiment using closed loop technology, in which case channel estimator 60 would also output the estimates $\alpha_j$, or values derived from those estimates such as a weight vector W, to a feedback channel for communication back to the base station that is transmitting to user station UST. Thus, such a feedback line is shown in FIG. 4 as a dashed line. In any event, returning to the open loop example of FIG. 4 and the communication of the channel estimates to MRC block 58, in response MRC block 58 applies the estimates to the despread symbols received from despreader 54. Further in this regard and although not separately shown, the MRC operation may be by way of various methods, such as using a rake receiver to combine each of the estimate-adjusted paths.

Following MRC block 58 in FIG. 4 are additional blocks/functions known in the art. For example, MRC block 58 outputs its result to a deinterleaver 62 which operates to perform an inverse of the function of an interleaver when an interleaver is included in base stations BST1 and BST2. Such an interleaver operates with respect to a block of encoded bits and shuffles the ordering of those bits so that the combination of this operation with an encoding operation exploits the time diversity of the information. For example, one shuffling technique that may be performed by such an interleaver is to receive bits in a matrix fashion such that bits are received into a matrix in a row-by-row fashion, and then those bits are output for further processing by the base station. In any event, therefore, deinterleaver 62 effectively operates in an opposite fashion to remove the effects on the symbols that were imposed by the corresponding base station interleaver. The output of deinterleaver 62 is connected to a channel decoder 64. Channel decoder 64 may include a Viterbi decoder, a turbo decoder, a block decoder (e.g., Reed-Solomon decoding), a combination of decoding techniques, or still other appropriate decoding schemes as known in the art. Moreover, in an alternative embodiment, channel decoder 64 could be eliminated if it is not desired to implement a forward error correction code scheme; indeed, in such a case deinterleaver 62 also could be eliminated (and the base station also would not require an interleaver). In any event, channel decoder 64 further decodes the data received at its input, typically operating with respect to certain error correcting codes, and it outputs a resulting stream of decoded symbols. Indeed, note that the probability of error for data output from channel decoder 64 is far less than that before processing by channel decoder 64. For example, under current standards, the probability of bit error in the output of channel decoder 64 may be between $10^{-3}$ and $10^{-6}$. Finally, the decoded symbol stream output by channel decoder 64 may be received and processed by additional circuitry in user station UST, although such circuitry is not shown in FIG. 4 so as to simplify the present illustration and discussion.

Figure 5:
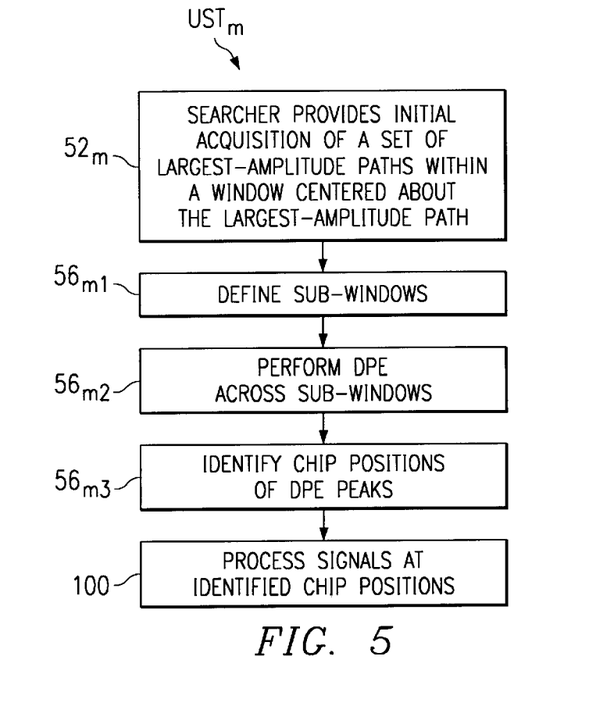
FIG. 5 illustrates a flow diagram of a method of operation of the user station block diagram in FIG. 4.
Figure 6:
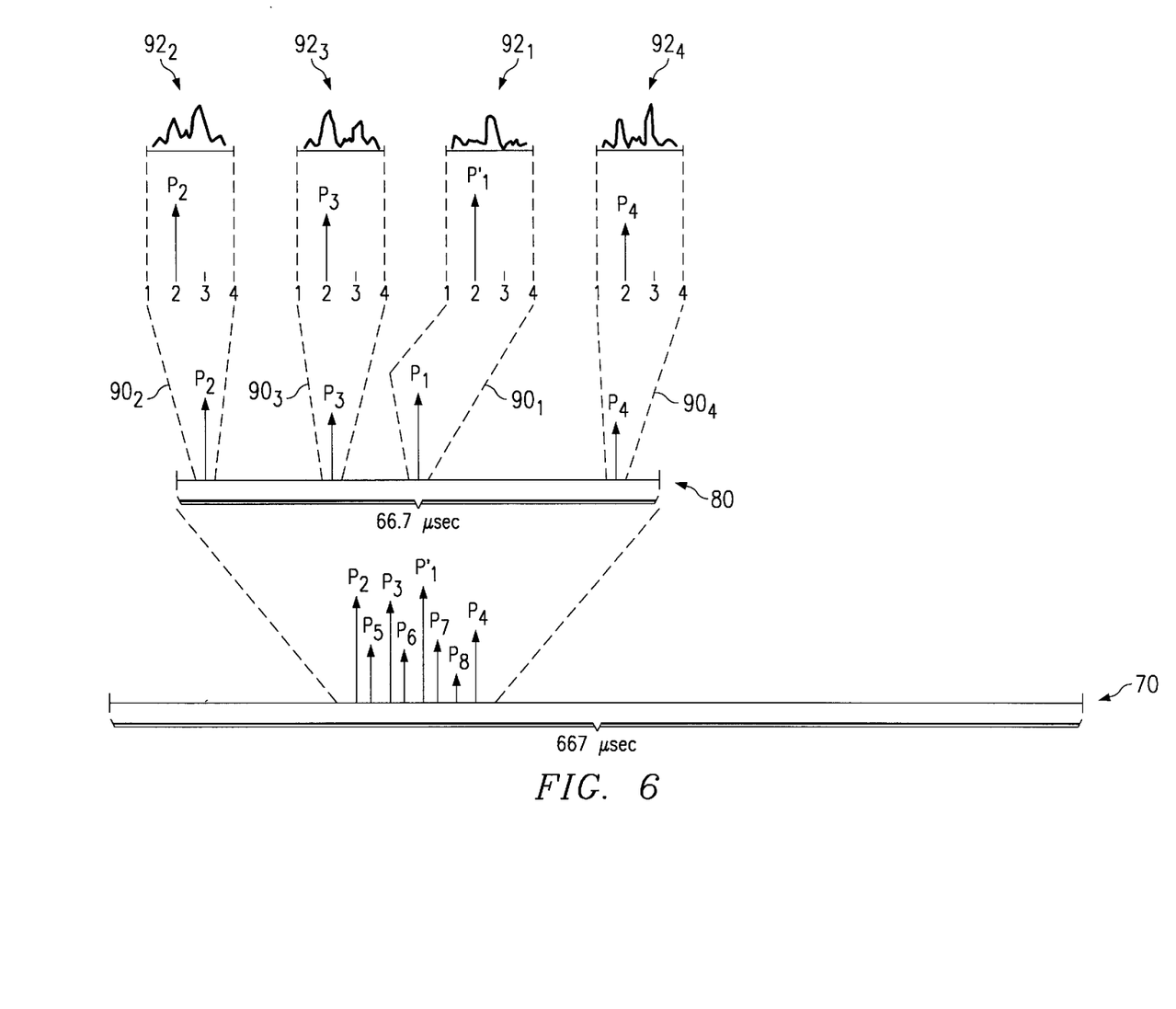
FIG. 6 illustrates a conceptual diagram demonstrating a first preferred embodiment for identifying multipaths at a receiver by evaluating a number of search sub-windows, wherein each of the search sub-windows includes one path from a set of large-amplitude paths within a duration including a maximum-amplitude path in a time slot window.

FIG. 5 illustrates a method UST$_m$ to further elaborate on the functionality and operation of user station UST described above, and this discussion is further demonstrated through the conceptual illustration of FIG. 6. Additionally, note that while method UST$_m$ is shown and described in a sequentially flowing manner, it should be understood that various operations may occur at the same time and also that the operations repeat for successively received signals, that is, while a given block may operate in a first instance with respect to a first signal received at a first time, once that operation is complete the given block repeats its operation in a second instance and with respect to a second signal received at a second time following the first time, and so forth for additional signals at later times.

Method UST$_m$ starts with a step 52$_m$ to detail the operation of searcher 52, where for this step and additional steps the convention is used such that a subscript "m" is added to the reference identifier of a block in FIG. 4 to describe the method of operation for the corresponding block. In step 52$_m$, searcher 52 performs an initial path acquisition by examining a time slot window of paths shown as time slot window 70 in FIG. 6. By way of example, where each of the time slots SL$_1$ through SL$_{15}$ from FIG. 3 has a duration of 667 $\mu$sec, then this is also the duration for time slot window 70. Preferably the search technique by searcher 52 measures the correlation of the PSC with the signal at each half-chip within time slot window 70, that is, twice per chip and where such positions are referred to in this document as sample positions. The PSC correlation measure is made in order to identify the path within time slot window 70 which has the greatest amplitude and its corresponding sample position. Correlation determinations may be achieved using various techniques, one of which is further detailed below. Regardless of the technique of step 52$_m$ to determine the largest-amplitude path, however, by way of illustration this largest-amplitude path is shown as path P'$_1$ in FIG. 6.

Figure 7:
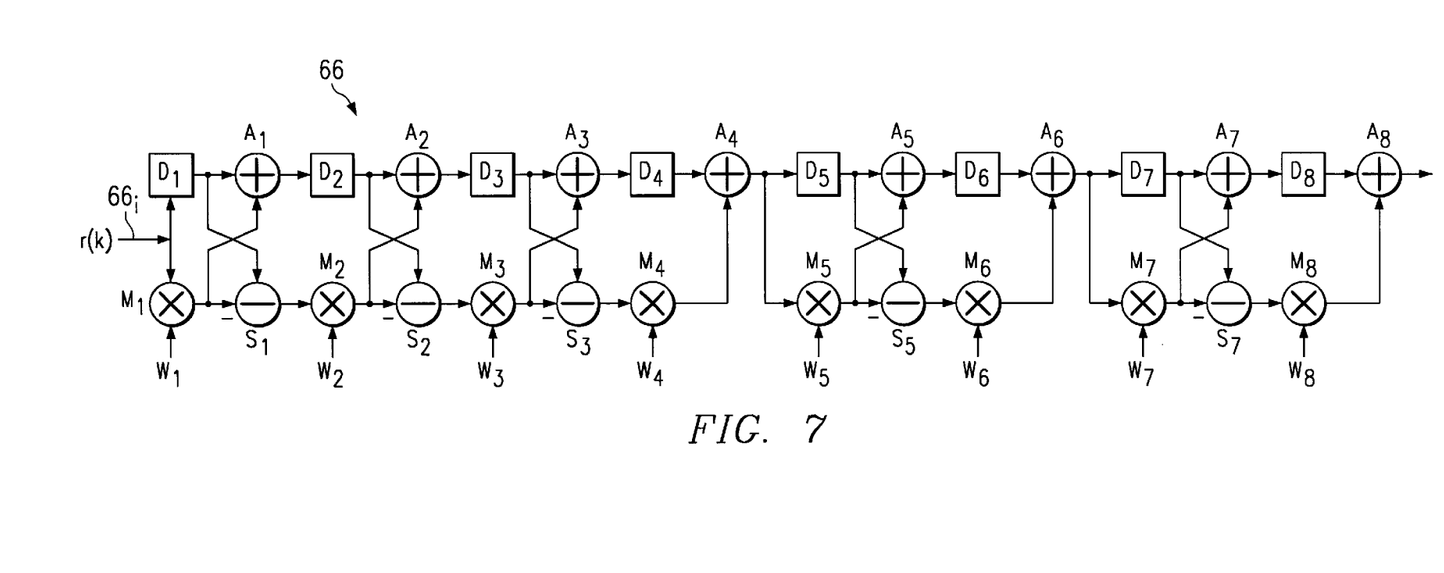
FIG. 7 illustrates an efficient Golay sequence correlator.

FIG. 7 illustrates an efficient Golay sequence correlator designated generally at 66 and that may be used by searcher 52 to perform its correlation of the PSC, where correlator 66 was jointly proposed on Jun. 1–4, 1999, to 3GPP TSG RAN WG1 (T doc 99-567), by Texas Instruments Incorporated and Siemens in a paper entitled "Generalized hierarchical Golay sequence for PSC with low complexity correlation using pruned efficient Golay correlators." Correlator 66 is directed to a particular PSC sequence, which is a Golay sequence defined in a standard as the following sequence:

$$PSC = A, A, A, \overline{A}, \overline{A}, A, \overline{A}, \overline{A}, A, A, A, \overline{A}, A, \overline{A}, A, A$$

where, A=0, 0, 0, 0, 0, 1, 1, 0, 1, 0, 1, 0, 1, 1, 0 and $\overline{A}$ is the complement of A. Correlator 66 will be understood by one skilled in the art and, thus, is only briefly discussed here. Correlator 66 has an input 66$_i$ for receiving the data symbols shown in FIG. 7 as r(k). The symbols are connected to a series of eight delay elements D$_1$ through D$_8$, having respective delays of 1, 2, 4, 8, 16, 32, 64, and 128 chips. The output of each of delay elements D$_1$, D$_2$, D$_3$, D$_5$, and D$_7$ is connected as an input to both an add circuit and a subtract circuit using a corresponding subscript (i.e., 1, 2, 3, 5, 7) along with an "A" for each add circuit and an "S" for each subtract circuit. The output of each of delay elements D$_4$, D$_6$, and D$_8$ is connected only to a corresponding add circuit A$_4$, A$_6$, and A$_8$. Finally, correlator 66 includes multipliers M$_1$ through M$_8$, each receiving as one multiplicand a corresponding weight value W$_1$ through W$_8$. Multipliers M$_2$, M$_3$, M$_4$, M$_6$, and M$_8$ also receive as another multiplicand the output of a preceding subtract circuit S$_1$, S$_2$, S$_3$, S$_5$, and S$_7$, while multiplier M$_1$ receives r(k) as a second multiplicand and multipliers M$_5$ and M$_7$ also receive as another multiplicand the output of a preceding add circuit $A_4$ and $A_6$. The output of each of multipliers $M_1$, $M_2$, $M_3$, $M_5$ and $M_7$ is connected as an input to both a corresponding add circuit and subtract circuit (e.g., the output of $M_1$ is connected as an input to $A_1$ and $S_1$, the output of $M_2$ is connected as an input to $A_2$ and $S_2$, and so forth), while the output of each of multipliers $M_4$, $M_6$, and $M_8$ is connected as an input to only a corresponding add circuit (e.g., the output of $M_4$ is connected as an input to $A_4$, the output of $M_6$ is connected as an input to $A_6$, and so forth).

The operation of correlator 66 is relatively straightforward given the connections set forth above. The input signal r(k) is mathematically processed by the various add, subtract, and multipliers, with sample position delays imposed by delay elements $D_1$ through $D_8$. Further, each of the weight values $W_1$ and $W_3$ through $W_8$ equal 1, while the weight value $W_2$ equals −1. The effect of a −1 weight value, therefore, effectively reverses the add and subtract operations, that is, after a signal is multiplied by −1 by multiplier $M_2$, then the next addition by add circuit $A_2$ is adding a negative result which corresponds to a subtraction, while the next subtract by subtract circuit $S_2$ is subtracting a negative result which corresponds to an addition. As to the remaining operation of correlator 66, its particular configuration is established to exploit the hierarchical structure that is in the Golay PSC sequence defined above; given that structure, rather than having to perform additions/subtractions for each of the 256 bits in that sequence, correlator 66 performs a lesser number of operations while still producing a usable output correlation measure.

Returning to step $52_m$, it not only identifies the sample position of the single largest-amplitude path $P'_1$, but in the preferred embodiment step $52_m$ also identifies the sample position for more than one path, that is, for a set of paths having more than one path. The step $52_m$ set of paths includes the single largest-amplitude path $P'_1$ but also includes, for a window 80 centered about the sample position of the largest-amplitude path, $P'_1$ the sample position for a number of the next largest amplitude paths. For the sake of example, let this set of paths consist of four paths and thus, the set includes path $P'_1$ as well as the next three largest-amplitude paths within window 80 (although, as discussed later, a different number of paths may be included in the set, such as 8, 16, or still others). Further, in the preferred embodiment the duration of window 80 (i.e., centered about the sample position of $P'_1$) is equal to one-tenth the duration of time slot window 70, that is, the duration of window 80 is 66.7 μsec. To further illustrate step $52_m$, therefore, FIG. 6 illustrates a number of paths $P'_1$ through $P_8$ within window 80, with the height of each path demonstrating its respective amplitude. Note that other paths (with magnitude less than $P'_1$) will appear outside of window 80, but they are not shown in FIG. 6 so as to simplify the Figure. In any event, because step $52_m$ identifies path $P'_1$ as well as the next three largest paths within window 80, then step $52_m$ identifies paths $P'_1$, $P_2$, $P_3$, and $P_4$. Finally, this set of paths identified by searcher 52 are output to a sub-window DPE block 56 via the PATH_SET signal.

Step $56_m$ generally describes the preferred operation of sub-window DPE block 56, which may be discussed in three operations and which are therefore shown separately in FIG. 5 as steps $56_{m1}$, $56_{m2}$, and $56_{m3}$. As a first operation, step $56_{m1}$ defines a number of sub-windows equal to the number of paths in the PATH_SET signal. Thus, from the preceding example wherein the PATH_SET signal identifies a total of four paths (or the sample positions of those paths), then sub-window DPE block 56 defines four sub-windows, each corresponding to a respective one of the paths represented in the PATH_SET signal. These four sub-windows are shown as sub-windows $90_1$, $90_2$, $90_3$, and $90_4$ in FIG. 6, corresponding to paths $P'_1$, $P_2$, $P_3$, and $P_4$, respectively. Further, in the preferred embodiment, each sub-window is of the same duration, such as four sample positions wide by way of example, and the sub-window is located such that the path to which it corresponds is located at either the second or third sample position within the sub-window (i.e., at or near the center of the sub-window). Thus, by way of example, in FIG. 6 each of paths $P'_1$, $P_2$, $P_3$, and $P_4$, is located in the second sample position of its corresponding sub-window.

As a second operation, step $56_{m2}$ performs a DPE, preferably in one-half chip increments, across each of the four sample positions in sub-windows $90_1$, $90_2$, $90_3$, and $90_4$. More particularly, the DPE is designed to identify paths from a specific base station and, toward this end, step $56_{m2}$ preferably correlates to the long code of that specific base station. Thus, for each sub-window, a total of four long code correlations are evaluated, and this second step therefore involves only a total of 16 evaluations (i.e., 4 windows*4 evaluations/window=16). Additionally, the manner of measuring correlations in step $56_{m2}$ gives rise to alternative embodiments. In a first approach, the DPE across each of sub-windows $90_1$, $90_2$, $90_3$, and $90_4$ may be only with respect to the pilot symbols at each half-chip sample position. Note that the pilot symbol is modulated with a long code, which is a base station specific code, whereas the PSC, used for DPE in step $52_m$ is not modulated with the long code. Thus, the DPE in step $56_{m2}$ is more complicated in that the long code must be stripped from the pilot symbol in order to perform the DPE and the Golay structure is not present and, therefore, step $56_{m2}$ does not lend itself to an efficient correlator structure such as shown in FIG. 7. Further, in a second approach, the DPE across each of sub-windows $90_1$, $90_2$, $90_3$, and $90_4$ is performed with respect to both pilot symbols (i.e., symbols having known values when received by the receiver) as well as data/control symbols (i.e., symbols having unknown values when received by the receiver). Here again, the long code must be stripped from the symbols. Further, in this latter approach, preferably the DPE is computed coherently for pilot symbols and noncoherently for data/control symbols. In any event, the result of the DPE operations produces a spectrum $92_1$, $92_2$, $92_3$, and $92_4$, corresponding to each respective sub-window $90_1$, $90_2$, $90_3$, and $90_4$ The third operation of step $56_{m3}$ is responsive to the spectrums $92_1$, $92_2$, $92_3$, and $92_4$. Particularly, in the third operation sub-window DPE block 56 outputs a control signal PATH_ASSIGN to despreader 54, where PATH_ASSIGN identifies one sample position from any one or more of spectrums $92_1$, $92_2$, $92_3$, and $92_4$ (i.e., up to four sample positions). More particularly, the identified sample positions are those corresponding to the largest peak in each corresponding spectrum so long as that largest peak is from the specific base station to which the step $56_{m2}$ long code DPE was directed. In other words, there is the possibility for one or more of spectrums $92_1$, $92_2$, $92_3$, and $92_4$ that the largest path in the spectrum may be below a designed threshold, where this reduced value therefore indicates for that case that the largest path is not from the base station being considered by the DPE (i.e., does not correlate well to the long code used by the DPE). In such a case, no path is identified in PATH_ASSIGN for the sub-window corresponding to the spectrum having a peak value below the threshold. Further, assuming that the largest peak does correlate to the base station being considered, note further that such a large peak, in any of spectrums $92_1$, $92_2$, $92_3$, and $92_4$, may or may not correspond to the sample position of the largest-amplitude path (i.e., paths $P'_1$, $P_2$, $P_3$, and $P_4$) corresponding to the spectrum. In any event, the designation of the PATH_ASSIGN positions configures despreader 54 so that it will only despread those incoming signals from input 50 that correspond to the four (or less) sample positions in PATH_ASSIGN.

Following step $56_{m3}$, FIG. 5 concludes by indicating that method $UST_m$ processes the signals corresponding to the four sample positions in PATH_ASSIGN. This processing is generally according to the operations described earlier with respect to the remaining blocks in FIG. 4. Thus, despreader 54 despreads the incoming signal at the sample positions identified by PATH_ASSIGN and outputs a corresponding stream of symbols to MRC block 58. Further in this respect, despreader 54 is said to have fingers whereby each separate finger corresponds to the despreading of the signals at a separate one of the sample positions identified by PATH_ASSIGN; thus, despreader 54 includes four fingers, one for each of the sample positions identified by PATH_ASSIGN. Similarly, this type of finger assignment is true of MRC block 58. Specifically, channel estimator 60 determines estimated channel impulse responses based only on the fingers of the incoming despread symbols (i.e., the four sample positions), and in response to these estimates, MRC block 58 combines each path (or finger) into a single signal output, again such as through the use of a rake receiver which has fingers corresponding to each of the incoming signals to be combined. Thereafter, the output of MRC block 58 is further processed by deinterleaver 62 and channel decoder 64 as described earlier.

Having detailed a preferred embodiment, attention is now further directed to comparing it to the prior art. Specifically, recall that the prior art is noted above as being particularly computational-intensive, and the present inventors have observed that a great deal of the prior art computations arise from the prior art DPE across the 512 sample positions of search window 20. In contrast, however, the preceding discussion of the preferred embodiment demonstrates, such as with reference to FIG. 6, that the preferred embodiment performs its DPE across fewer sample positions due to the use of sub-windows. Indeed, in the example of FIG. 6, the DPE is only across 16 positions which therefore represents a computation reduction on the order of 97% versus an approach requiring a DPE over 512 positions. Further, note that the number of sub-windows could be changed, as well as the number of sample positions within the sub-windows, while still realizing a reduction of computation as compared to the prior art. Indeed, simulations of the preferred embodiment described above have shown favorable performance using eight sub-windows, each having four sample positions, and thereby performing the step $56_{m2}$ DPE at all four sample positions in each of those eight sub-windows. Nevertheless, some benefit over the prior art is realized in any different numeric combination of sub-windows and sample positions so long as the product of the number of sub-windows and the number of sample positions within the sub-windows is less than the one-half chip increment sample positions examined within search window 20 by the prior art. In other words, the preferred embodiment still realizes a benefit over the prior art when some of the sample positions of search window 20 are eliminated from the DPE analysis, and in the preferred embodiment this elimination is achieved through the use of at least two sub-windows where between those two sub-windows there is one or more sample positions that are not analyzed in the step $56_{m2}$ DPE operation.

Figure 8:
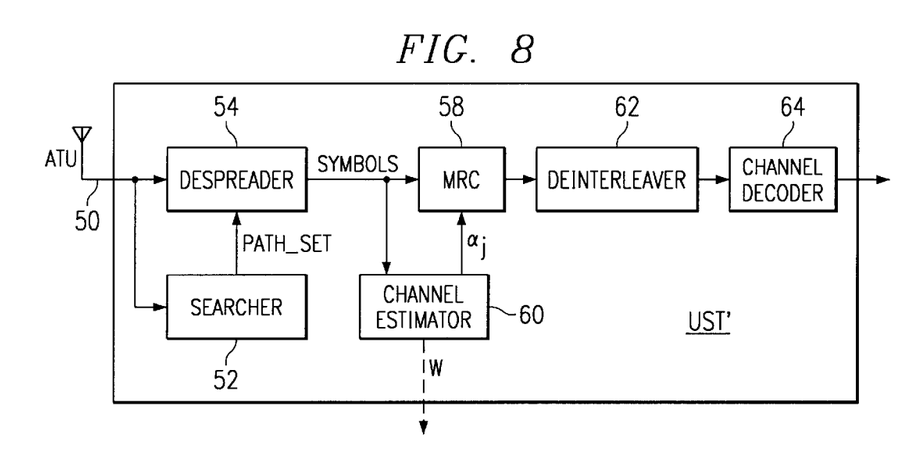
FIG. 8 illustrates a block diagram of the circuitry of a user station according to an alternative preferred embodiment wherein a number of paths identified by PSC correlations measured across a time slot window are used to identify positions of paths to be combined.

FIG. 8 illustrates a block diagram of the circuitry of a user station according to an alternative preferred embodiment and, thus, the user station in FIG. 8 is designated generally at UST'. User station UST' is the same as user station UST of FIG. 4 in many respects and, thus, to show like items, like reference numbers are carried forward from FIG. 4 to FIG. 8. Indeed, the difference between stations UST' and UST is in that block 56 of station UST in FIG. 4 is eliminated in station UST' of FIG. 8. Thus, the PATH_SET signal from searcher 52 is connected directly to despreader 54. The effect of these modifications is discussed below in connection with FIG. 9.

Figure 9:
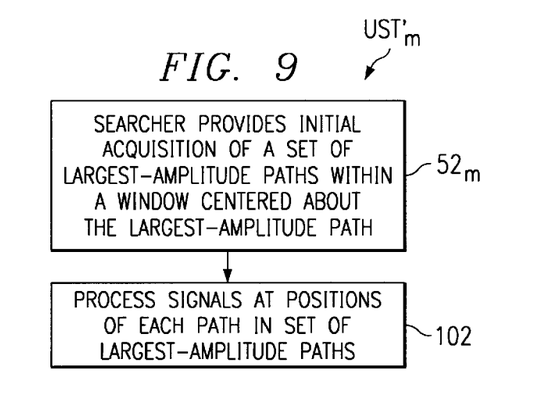
FIG. 9 illustrates a flow diagram of a method of operation of the user station block diagram in FIG. 8.

FIG. 9 illustrates a flow diagram of a method $UST'_m$ of operation of user station UST' in FIG. 8. One skilled in the art will readily appreciate that method $UST'_m$ is comparable to method $UST_m$ of FIG. 5. Indeed, the first step $52_m$ is identical in both methods and recall that step $52_m$ performs an initial path acquisition by measuring the correlation of the PSC across a time slot window of paths (shown as time slot window 70 in FIG. 6) and then identifying a set of paths including the single largest-amplitude path $P'_1$ within that time slot as well as a number of additional largest-amplitude paths within a smaller window (e.g., window 80, which is $\frac{1}{10}^{th}$ window 70) and centered about the single largest-amplitude path. However, in FIG. 9, immediately following step $52_m$ is a step 102. In step 102, user station UST' processes the paths received by antenna ATU at the sample positions corresponding to each path identified by the PATH_SET signal (i.e., each of the largest-amplitude paths identified in step $52_m$). Thus, in method $UST'_m$, and unlike the previously-described embodiment, there is no additional definition of sub-windows and no DPE with respect to those sub-windows. Instead, the results of step $52_m$ in method $UST'_m$ are used to directly assign the fingers of operation of various remaining blocks of user station UST'. For example, assuming that PATH_SET signal identifies four largest-amplitude signals, then each of four fingers of despreader 54 despreads the symbols at a sample position corresponding to one of those four largest-amplitude signals. Thereafter, channel estimator 60 determines estimates for the resulting four streams of symbols, and MRC block 58 assigns each of four fingers to the resulting four streams of symbols to thereby combine those four streams into a single stream and in response to the estimates from channel estimator 60.

Having detailed methods $UST'_m$ and UST, various observations may be made with respect to the differences of the two methods. For example, method $UST'_m$ eliminates the additional computational complexity incurred by method $UST_m$ in that the latter performs a DPE across sub-windows, and indeed that DPE is more extensive than the operations of method $UST'_m$ because method $UST'_m$ only measures PSC correlations whereas the DPE of method UST is with respect to symbols including a long code (i.e., either pilot, or both pilot and data/control). However, as a. tradeoff, the elimination of the DPE by method $UST'_m$ causes fingers to be assigned based solely on the PSC correlations. As known in the art, the PSC is essentially a synchronization signal and the same PSC is transmitted by numerous different base stations. Thus, method $UST'_m$ does not include a PSC-independent step and, therefore, it may inadvertently identify one or more largest-amplitude paths that are actually from a base station other than the one with which the user station is intending to communicate. However, this possibility is relatively small because the largest-amplitude paths are preferably taken from an area which is only across one-tenth of the overall time slot window (i.e., where that one-tenth region is centered about the largest-amplitude path) and it is likely that the majority of the largest-amplitude paths within this area are from the base station with which the user station is intending to communicate.

Having detailed method UST'$_m$, the differences between it and the prior art as described in the Background Of The Invention section of this document also may be examined. Recall that for finger assignment the prior art typically performs a DPE across a search window and with respect to the pilot symbols at each sample position in that window—this approach is very computationally intensive and may include on the order of billions of operations per second. In contrast, however, for the preferred embodiment and from the operation of searcher 52 in the first acquisition stage during which searcher 52 correlates to the PSC, method UST'$_m$ is able to assign the fingers of operation of various remaining blocks of user station UST' in response to the PSC correlations by searcher 52 and, therefore, without requiring the extensive DPE as is the case in the prior art.

Having demonstrated the preferred embodiment and various alterations that may be made to such embodiments, the present inventive teachings may apply to other systems as well. For example, the preceding examples have shown a large spreading factor FDD user station in that user station UST includes an MRC block 58 for combining various multipaths. However, as mentioned earlier, for either a small spreading factor FDD communication or a TDD communication, multipaths are still combined, but such operations are performed by what may be referred to as a joint detector which includes both a rake receiver and an equalizer function to combine the various identified paths. Thus, the earlier inventive teachings wherein signal combining is achieved either in response to PATH_ASSIGN or directly from PATH_SET also may apply to these additional systems, wherein finger assignment would in those systems apply to not only the despreader in such systems but also to the joint detector.

From the above, it may be appreciated that the above embodiments provide a user station for use in a wireless system and for assigning fingers to combine multipaths in response to a set of largest-amplitude multipaths identified by PSC correlation measurements across a time slot window. Further, while the present embodiments have been described in detail, various substitutions, modifications or alterations could be made to the descriptions set forth above without departing from the inventive scope. Indeed, various different embodiments have been described which assist in developing this inventive scope. In addition, still other changes may be made to the inventive teachings. For example, the receiving circuits of FIGS. 4 and 8 are only two of many receiver embodiments which may incorporate the teachings of this document. As another example, while methods UST$_m$ and UST'$_m$ preferably center a window 80 about the sample position of a largest-amplitude path, P'$_1$, in an alternative embodiment the window may be centered about a different path; for example, during an initial acquisition a PSC correlation may reveal a first path which is relatively large and corresponds to a first base station, while thereafter a DPE may reveal a second path from a second base station that is larger than the first path—in this case, finger assignment may continue to be based on the first path where it is desired that the user station continue to communicate with the first base station (e.g., before handoff to the second base station) and, thus, in this case, step 52$_m$ may locate its paths as centered about the first largest path rather than the second. In any event, for this and other possibilities it may be stated that the correlations of step 52$_m$ are across a group of the symbols, where that group may be considered either search window 70 as a whole, or a portion thereof such as window 80—in both cases, the inventive method identifies a plurality of paths within that group where the relative magnitude of those paths within that group are large, but outside of the group there may be larger paths. Still other examples will be ascertainable by one skilled in the art. From the above, therefore, one skilled in the art should further appreciate the inventive scope as defined by the following claims.

What is claimed is:

1. A wireless receiver, comprising:
   at least one antenna for receiving a plurality of frames in a form of a plurality of paths;
   wherein each of the plurality of frames comprises a plurality of time slots;
   wherein each of the plurality of time slots comprises a plurality of symbols;
   wherein each of the plurality of paths has a corresponding sample position; and
   wherein the plurality of symbols comprise a primary synchronization code symbol;
   circuitry for correlating a primary synchronization code across a group of the plurality of symbols from a plurality of remote transmitters;
   circuitry for identifying a plurality of path positions within the group, wherein each of the plurality of path positions corresponds to a respective one of a plurality of largest-amplitude paths represented within the group as detected in response to the circuitry for correlating; and
   circuitry for combining the plurality of largest-amplitude paths from the plurality of remote transmitters in response to identification of those paths by the circuitry for identifying.

2. The wireless receiver of claim 1 wherein the circuitry for combining comprises circuitry for despreading the plurality of largest-amplitude paths.

3. The wireless receiver of claim 2 wherein the circuitry for combining comprises:
   circuitry for estimating a channel estimate for each of the plurality of largest-amplitude paths; and
   rake receiver circuitry for combining the plurality of largest-amplitude paths in response to the channel estimate for each of the plurality of largest-amplitude paths.

4. The wireless receiver of claim 2 wherein the circuitry for combining comprises a joint detector for combining the plurality of largest-amplitude paths.

5. The wireless receiver of claim 1:
   wherein the group of the plurality of symbols has a duration equal to a duration of each of the plurality of time slots; and
   wherein the plurality of path positions are within a time window having a duration less than the duration of each of the plurality of time slots.

6. The wireless receiver of claim 5 wherein the circuitry for combining comprises circuitry for despreading the plurality of largest-amplitude paths.

7. The wireless receiver of claim 6 wherein the circuitry for combining comprises:
   circuitry for estimating a channel estimate for each of the plurality of largest-amplitude paths; and
   rake receiver circuitry for combining the plurality of largest-amplitude paths in response to the channel estimate for each of the plurality of largest-amplitude paths.

8. The wireless receiver of claim 6 wherein the circuitry for combining comprises a joint detector for combining the plurality of largest-amplitude paths.

9. The wireless receiver of claim 5 wherein the plurality of path positions are within a time window having a duration equal to one-tenth the duration of each of the plurality of time slots.

10. The wireless receiver of claim 1 wherein the circuitry for combining comprises circuitry for despreading only the plurality of largest-amplitude paths.

11. The wireless receiver of claim 1 wherein the plurality of frames comprise time division duplex frames.

12. The wireless receiver of claim 1 wherein the plurality of frames comprise frequency division duplex frames.

13. The wireless receiver of claim 1 wherein the receiver comprises a CMDA receiver.

14. The wireless receiver of claim 1 wherein the receiver comprises a WCMDA receiver.

15. A wireless receiver, comprising:
  at least one antenna for receiving a plurality of frames in a form of a plurality of paths;
  wherein each of the plurality of frames comprises a plurality of time slots;
  wherein each of the plurality of time slots comprises a plurality of symbols;
  wherein each of the plurality of paths has a corresponding sample position; and
  wherein the plurality of symbols comprise a primary synchronization code symbol and a secondary synchronization code symbol;
  circuitry for correlating a primary synchronization code across a group of the plurality of symbols;
  circuitry for identifying a plurality of path positions within the group, wherein each of the plurality of path positions corresponds to a respective one of a plurality of largest-amplitude paths represented within the group as detected in response to the circuitry for correlating; and
  circuitry for combining paths selected in response to identification of the plurality of largest-amplitude paths by the circuitry for identifying, and wherein the paths selected are not selected in response to a delay profile estimation with respect to pilot symbols in the plurality of paths.

16. The wireless receiver of claim 15 wherein the paths selected comprise the plurality of largest-amplitude paths.

17. A method of operating a wireless receiver, comprising the steps of:
  receiving a plurality of frames in a form of a plurality of paths from at least one antenna;
  wherein each of the plurality of frames comprises a plurality of time slots;
  wherein each of the plurality of time slots comprises a plurality of symbols;
  wherein each of the plurality of paths has a corresponding sample position; and
  wherein the plurality of symbols comprise a primary synchronization code symbol;
  correlating a primary synchronization code across a group of the plurality of symbols from a plurality of remote transmitters;
  identifying a plurality of path positions within the group, wherein each of the plurality of path positions corresponds to a respective one of a plurality of largest-amplitude paths represented within the group as detected in response to the circuitry for correlating; and
  combining the plurality of largest-amplitude paths from the plurality of remote transmitters in response to identification of those paths by the step of identifying.

18. The method of claim 17 wherein the step of combining comprises despreading the plurality of largest-amplitude paths.

19. The method of claim 18 wherein step of combining comprises:
  estimating a channel estimate for each of the plurality of largest-amplitude paths; and
  combining the plurality of largest-amplitude paths with rake receiver circuitry in response to the channel estimate for each of the plurality of largest-amplitude paths.

20. The method of claim 18 wherein the step of combining comprises operating a joint detector for combining the plurality of largest-amplitude paths.

21. The method of claim 17:
  wherein the group of the plurality of symbols has a duration equal to a duration of each of the plurality of time slots; and
  wherein the plurality of path positions are within a time window having a duration less than the duration of each of the plurality of time slots.

22. The method of claim 17 wherein the step of combining comprises despreading only the plurality of largest-amplitude paths.

* * * * *